United States Patent Office 2,771,795
Patented Nov. 27, 1956

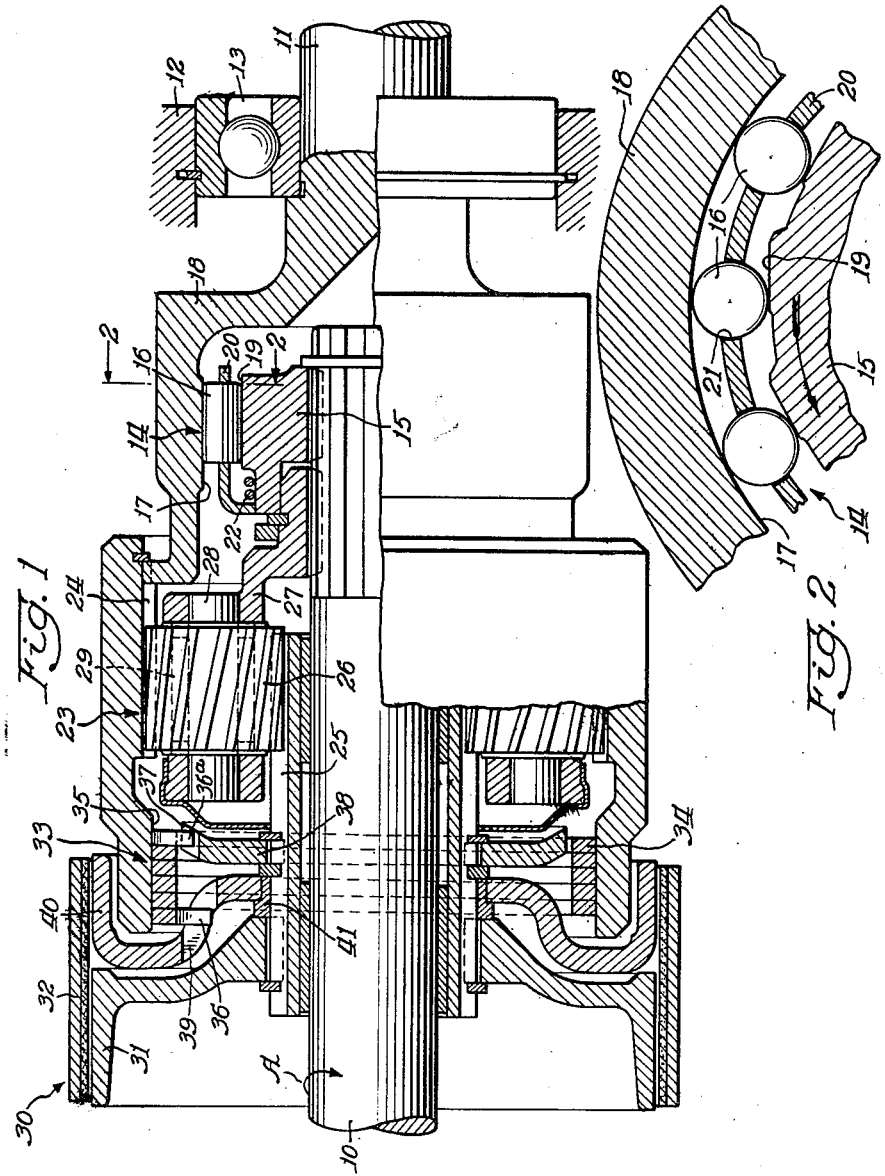

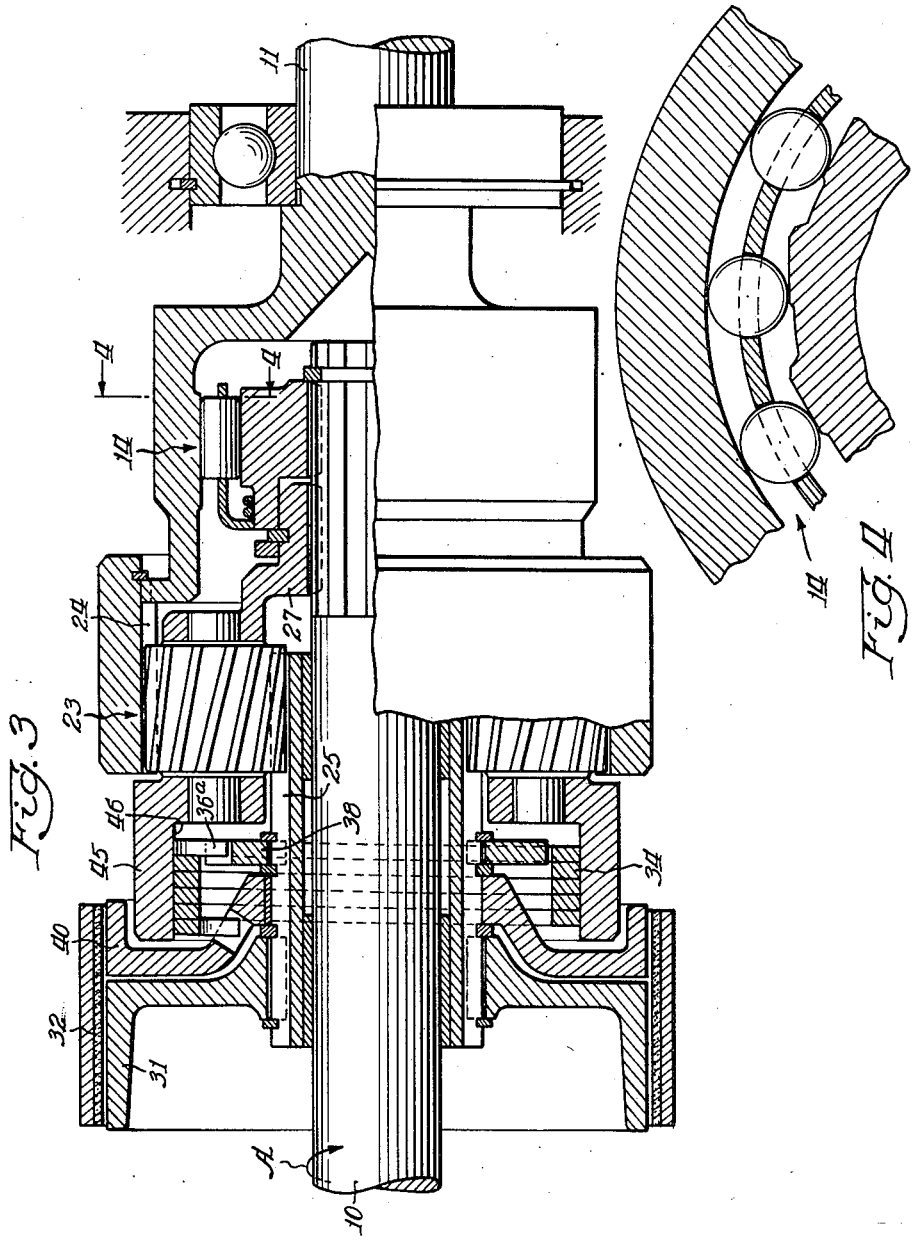

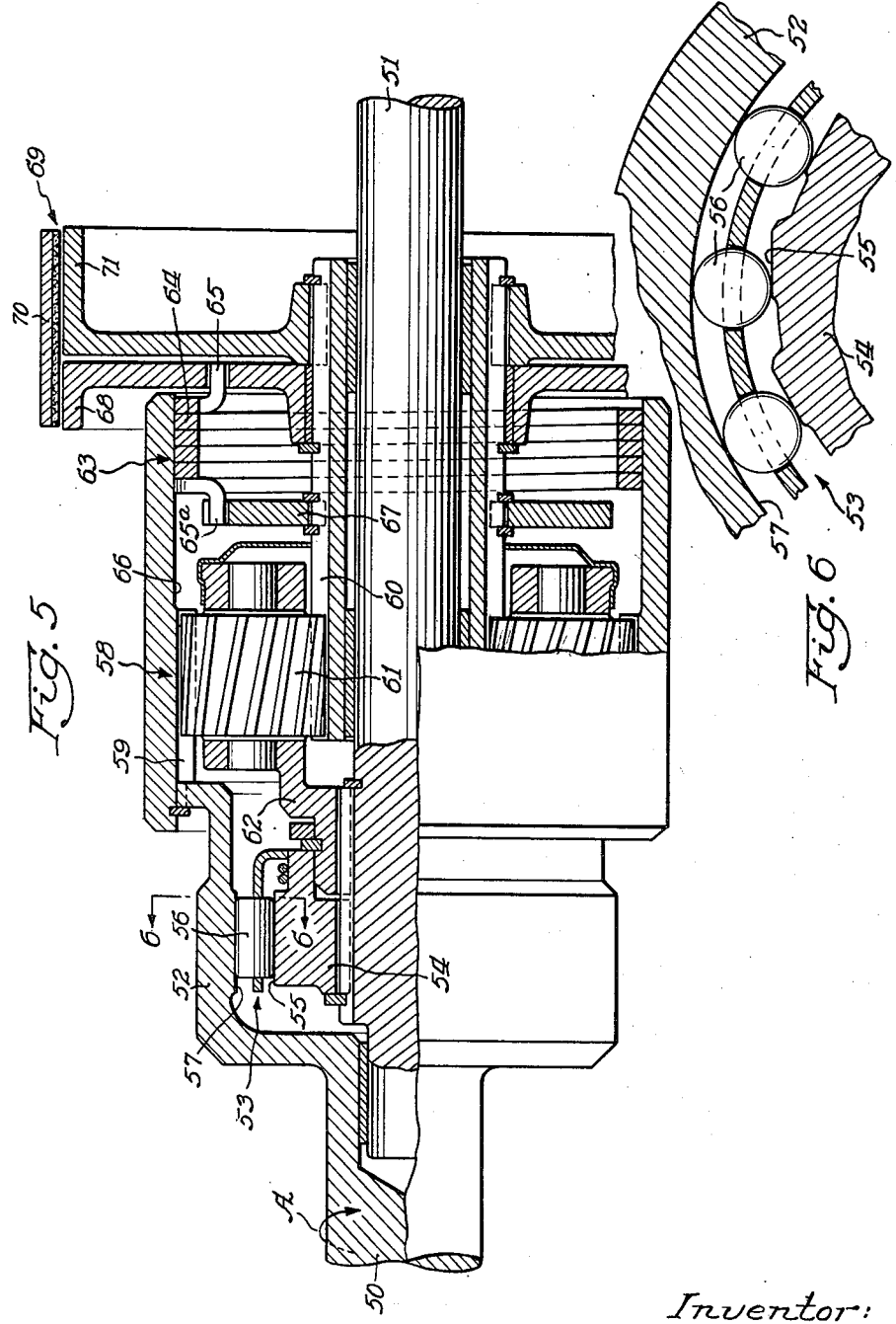

2,771,795

TRANSMISSION

Palmer Orr, Muncie, Ind., assignor to Borg-Warner Corporation, Chicago, Ill., a corporation of Illinois Continuation of application Serial No. 99,890, June 18, 1949. This application April 19, 1952, Serial No. 283,163

4 Claims. (Cl. 74—781)

My invention relates to transmissions for automotive vehicles.

This is a continuation of my copending application Serial No. 99,890, filed June 18, 1948, now abandoned.

Transmissions of the overdrive type which provide a one-way direct drive and a two-way overdrive are in common usage. Such transmissions generally comprise a planetary gear set and a brake for a reaction element of the gear set for completing an overspeed power train through the transmission. A one-way clutch is provided between the drive and driven shafts for providing a one-way direct drive from the transmission drive shaft to the driven shaft.

It is an object of the invention to provide an improved two speed transmission, such as an overdrive transmission as just mentioned, which may be power shifted (that is, without any cessation of driving torque on the drive shaft) from a two-way low speed drive completed in part by such a one-way clutch as just mentioned to a two-way high speed drive. It is another object to provide in such a transmission an automatic engaging means which functions in conjunction with the one-way clutch to provide a two-way direct drive through the transmission and mechanism for disengaging the engaging means when the brake for completing the change-speed drive through the transmission is made operative. In this connection it is a more specific object to provide a one-way clutch functioning as such an automatic engaging means to complete a direct drive through the transmission in the direction opposite to that completed by the first-named one-way clutch.

It is another object of the invention to provide such an automatic clutch which is in the form of a helical spring arranged to engage a cylindrical surface and to provide braking means connected with one end of the spring actuated by the change-speed power train completing brake for winding up the spring to disengage it from the cylindrical surface.

The invention consists of the novel constructions, arrangements and devices to be hereinafter described and claimed for carrying out the above-stated objects and such other objects as will appear from the following description of preferred embodiments of the invention, illustrated with reference to the appended drawings, wherein:

Fig. 1 is a longitudinal sectional view of a transmission embodying the principles of the invention;

Fig. 2 is a sectional view on an enlarged scale taken on line 2—2 of Fig. 1;

Fig. 3 is a longitudinal sectional view of a transmission constituting a modification of the invention;

Fig. 4 is a sectional view on an enlarged scale taken on line 4—4 of Fig. 3;

Fig. 5 is a longitudinal sectional view of a transmission constituting another modification of the invention; and Fig. 6 is a sectional view on an enlarged scale taken on line 6—6 of Fig. 5.

Like characters of reference designate like parts in the several views.

Referring now in particular to Figs. 1 and 2, the transmission illustrated comprises a drive shaft 10 and a driven shaft 11. The drive and driven shafts are adapted to be rotatably disposed within a transmission casing 12 by any suitable bearing means, the bearing 13 for example being utilized to rotatably dispose the shaft 11 within the casing 12. The transmission is adapted to be used in an automotive vehicle, and the drive shaft 10 may be driven from the driving engine of the vehicle preferably through a suitable change speed transmission (not shown) providing a plurality of forward speed ratios and a reverse drive, and the drivtn shaft 11 is adapted to be connected with the vehicle driving wheels (not shown) by any suitable connecting means such as the ordinary automobile propeller shaft and differential.

The transmission comprises a one-way clutch 14 disposed directly between the shafts 10 and 11 which functions to engage to complete a one-to-one forward drive from the drive shaft 10 to the driven shaft 11. The one-way clutch 14 comprises a hub 15 splined to the shaft 10, a plurality of cylindrical rollers 16, and an internal cylindrical surface 17 formed within a bell shaped portion 18 of the driven shaft 11. The hub 15 is provided with an inclined ramp 19 for each of the rollers 16 so that they may wedge between the ramp 19 and the internal surface 17 to engage the clutch 14. A carrier 20 is provided for the rollers 16 and has a slot 21 for receiving each of the rollers. A helical spring 22 is provided around an end portion of the hub 15 and acts on the carrier 20 tending to rotate it to yieldably hold the rollers 16 on the ramps 19 in potential engaging position. Since the construction of the one-way clutch 14 is common, it will not be further described in detail.

The transmission comprises a planetary gear set 23 having a ring gear 24, a sun gear 25 and a plurality of planet gears 26 (one being shown in the drawing) in mesh with the sun and ring gears. The planet gears 26 are rotatably disposed on a planet gear carrier 27 by means of stub shafts 28 and bearing needles 29 are preferably disposed within the gears 26 and on the shafts 28 for minimizing friction between the gears 26 and carrier 27. The sun gear 25 is adapted to constitute a reaction element of the gear set 23 and is made operative to function as such an element by means of a friction brake 30. The brake 30 comprises a brake drum 31 and a brake band 32. The band 32 is adapted to be contracted to engage the outer surface of the drum 31, and the band may be so engaged with the drum by any suitable well known mechanical linkage and motor (not shown).

A one-way clutch 33 is provided between the ring gear 24 and the sun gear 25. The clutch 33 comprises a right hand helix expanding type coil spring 34 adapted due to its own resiliency tending to uncoil and expand it to engage an internal cylindrical surface 35 formed in the ring gear 24. The coil spring 34 has end tangs 36 and 36a. The end tang 36a is received in a slot 37 provided in the outer periphery of an annular plate 38 splined to the sun gear 25. The end tang 36 of the spring 34 is received in a slot 39 provided in an annular drum 40 which is rotatably disposed on the sun gear 35 by means of a bearing sleeve 41 and within the band 32 so as to be adapted to be engaged thereby.

In operation, for forward drive of the vehicle, the shaft 10 is driven in the "forward" direction indicated by the arrow A, and the shaft 11 is driven in the same direction. Assuming the brake 30 is disengaged, the driven shaft 11 will be driven through the one-way clutch 14 from the drive shaft 10 in a one-to-one drive. The clutch 14 will engage with the rollers 16 wedging between the ramps 19 and the internal cylindrical surface 17 to carry the drive. With the shaft 11 being thus driven, no substantial torque is carried by the clutch 33; however, when the shaft 11 tends to drive, as when the vehicle is coasting, the clutch 33 engages to provide a one-to-one drive from the shaft 11 to the shaft 10. As is understood, the one-way clutch 14 would disengage for such a drive. When the shaft 11 in coasting of the vehicle tends to rotate faster than the shaft 10 in the direction of rotation indicated by the arrow A, the sun gear 25 due to the action of the gears 26 and 24 is tended to be driven in the "reverse" direction, that is, opposite to the direction of rotation indicated by the arrow A. The motion of the sun gear 25 is transmitted through the plate 38 to the tang end 36a of the coil spring 34, and the tendency of the sun gear 25 to rotate in the reverse direction causes the helical spring 34 to expand and unwind to engage the internal cylindrical surface 35 (the spring would tend to wind up and disengage from the surface 35 for a relative rotation of the sun gear 25 in the opposite direction). The clutch 33 thus engages to take the coast load or drive from the driven shaft 11 to drive shaft 10, and through the action of both the one-way clutches 14 and 33, an effective two-way drive exists between the drive shaft 10 and the driven shaft 11.

An overdrive power train is completed between the drive shaft 10 and the driven shaft 11 by engaging the friction brake 30. The band 32 functions to retard rotation and hold stationary the drum 31 and the sun gear 25 and since the carrier 27 is fixed to the drive shaft 10, the ring gear 24 and the shaft 11 fixed thereto are rotated at an overspeed in two-way drive with respect to the drive shaft 10. In this case the cylindrical surface 17 of the one-way clutch 14 rotates faster in the forward direction than the hub 15 and causes the rollers 16 to come out of effective wedging engagement between the ramps 19 and surface 17 to disengage the clutch 14 and cause it to overrun.

It will be apparent that the clutch 33 must be disengaged when the overdrive power train is effective, since, as has been explained, the clutch 33 functions to prevent an overrunning of the driven shaft 11 with respect to the drive shaft 10. A disengagement of the clutch 33 simultaneously with the engagement of the brake 30 is obtained through the action of the band 32 on the brake drum 40. In the two-way direct drive, the drum 40 is rotating along with and in the same direction as the elements of the gear set 23, and the band 32 is so disposed as to simultaneously engage and retard from rotation the drums 31 and 40. The retardation of rotation of the drum 40 is effective on the tank end 36 connected therewith, and the relative difference in speed between this tang end and the other tang end 36a connected with and rotating with the sun gear 25 causes the spring 34 to wind up and contract so as to disengage from the internal cylindrical surface 35

It is intended that the arrangement of the brake band 32 with respect to the drums 31 and 40 shall be such that the band 32 tends to decelerate the drum 40 and release the spring 34 simultaneously with a partial engagement of the drum 31. The drum 40 does not come to a stop immediately but continues to turn forwardly (in the direction of rotation indicated by the arrow A), being retarded by the friction of the band 32 to maintain the spring 34 disengaged. When eventually the drum 31 and sun gear 25 are brought to a stop by the band 32, the unit is in overdrive ratio. Since the spring 34 is released in overdrive and since the free wheel clutch 14 overruns, it is obvious that the overdrive ratio power train does not overrun either in the drive or coast directions and is a two-way drive. Furthermore, it will be clear from a consideration of the construction that the drum 40 will release the spring 34 upon application of the band 32 regardless of whether the vehicle throttle is open or closed, to cause either a drive load or a coast load to exist in the transmission, as long as the entire unit is rotating forwardly (in the direction of rotation indicated by the arrow A).

When the drive shaft 10 is driven in the reverse direction, the band 32 is released, and the spring 34 causes a completion of a one-to-one drive between the drive shaft 10 and driven shaft 11. This will be apparent from an inspection of the construction and from a study of the operation of the spring which for forward drive takes the coast load through the transmission and prevents the driven shaft 11 from rotating faster in the forward direction than the drive shaft 10.

The embodiment of the invention shown in Figs. 3 and 4 differs essentially from that just described in that the helical spring 34 is disposed effectively between the planet gear carrier 27 and the sun gear 25 rather than between the ring gear 24 and the sun gear 25. In this embodiment of the invention, the carrier 27 is provided with a hollow extension 45 having an internal cylindrical surface 46 therein. One end tang 36a of the spring 34 is fixed with respect to the sun gear 25 by means of the plate 38, and the other end tank 36 is fixed to the drum 40 as in the previously described embodiment of the invention. The spring 34 is disposed within the extension 45 and engages with the surface 46.

The operation of the Fig. 3 embodiment is very similar to the Fig. 1 embodiment. With the friction band 32 being released, a two-way direct drive exists through the transmission, the one-way clutch 14 engaging to drive the driven shaft 11 from the drive shaft 10 in a forward direction. The coast load is taken by the one-way clutch comprising the spring 34 which engages the internal cylindrical surface 46 when the driven shaft 11 tends to rotate faster in the forward direction than the shaft 10. The spring 34 in both embodiments is right hand helically coiled, and the same relative rotation for a coast load exists between the carrier 27 and the sun gear 25 as between the ring gear 24 and the sun gear 25 in the Fig. 1 embodiment, so that the spring 34 engages and remains engaged under the same conditions. The spring 34 is released by engagement of the band 32 on the drum 40 when the drum 31 is simultaneously being engaged to provide overdrive through the transmision.

The embodiment shown in Figs. 5 and 6 is quite similar to the previously described embodiments except that the transmission provides an underdrive instead of an overdrive, and the brake of the transmission is engaged for providing this underdrive. The transmission comprises a drive shaft 50 and a driven shaft 51. The shaft 50 is provided with a bell shaped portion 52, and a one-way clutch 53 is provided between this portion and the driven shaft 51. The one-way clutch is quite similar in construction to the one-way clutch 14 and comprises a hub 54 formed with ramps 55 and splined onto the driven shaft 51. A roller 56 is provided between each of the ramps and an internal cylindrical surface 57 formed within the shaft portion 52.

The planetary gear set 58 of the transmission comprises a ring gear 59, a sun gear 60, a plurality of planet gears 61 (one being shown in the drawing) in mesh with the gears 59 and 60, and a planet gear carrier 62 which is splined to the driven shaft 51.

A one-way clutch 63 is provided between the sun gear 60 and the ring gear 59, and the clutch comprises a left hand helically coiled spring 64 having an end tang 65 and an end tang 65a. The spring 64 is disposed within an internal cylindrical surface 66 formed in the ring gear 59 and is adapted to engage this surface. The end tang 65a is fixed with respect to the sun gear 60 by means of an annular plate 67 which is slotted in its outer periphery to receive the tang and is splined on the sun gear 60. The end tang 65 is received in an appropriate slot in a brake drum 68 which is rotatably disposed on the sun gear 60.

The sun gear 60 is braked by means of a brake 69 which comprises a brake band 70 adapted to engage a brake drum 71 that is splined to the sun gear 60.

The brake 69 is disengaged for a direct drive between the shafts 50 and 51. When the shaft 50 is rotated in the forward direction as indicated by the arrow A, the clutch 63 functions to take the drive load for driving the driven shaft in the same direction. The ring gear 59 rotates in the forward direction, and the sun gear 60 tends to rotate in the reverse direction so that the spring 64 engages on the surface 66. The elements of the planetary gear set 58 are thereby locked together, so that they rotate as a unit, whereby the shaft 51 is driven at a one-to-one drive with respect to the drive shaft 50. When the shaft 51 tends to drive in this direction, in this case the clutch 53 engages, the rollers 56 wedging between the ramps 55 and surface 57 to engage the clutch 53. Thus there exists a two-way forward drive between the shafts 50 and 51 with the drive load being taken by the clutch 63 and the coast load being taken by the clutch 53.

When it is desired to shift the transmission into underdrive speed ratio, the brake 69 is engaged by engaging the band 70 with the drum 71. The band 70 simultaneously engages the drum 68, and since in direct drive the drum 68 rotates in the forward direction along with the elements of the gear set 58, the band 70 in engaging the drum 68 retards its rotation in this direction so that the spring 64 is wound up and is disengaged from the internal surface 66. The band 70 in completely engaging the drum 71 completes the underdrive power train and also functions to maintain the spring 64 disengaged from the surface 66. The brake band 70 in holding the drum 71 and thereby the sun gear 60 stationary renders the gear 60 the reaction member of the gear set, and the carrier 62 and shaft 51 are driven at a lower speed and in the same direction as the shaft 50. Under these conditions the one-way clutch 53 overruns.

For a reverse drive wherein the shaft 50 is driven in a direction opposite to that indicated by the arrow A, the one-way clutch 53 engages and transmits the drive to the shaft 51. Under these conditions, the brake 69 is maintained disengaged, and the planetary gear set is locked up and rotates as a unit.

My improved transmissions allow a power shifting by the engagement of the illustrated friction brakes, that is, the transmissions may be shifted into their change speed ratios by engagement of friction engaging means regardless of whether the vehicle engine is driving or not. The direct drive power trains, due to the action of the helically coiled spring clutches, are two-way drives, and these power trains may thus be utilized for both forward and reverse drives.

I wish it to be understood that my invention is not to be limited to the specific constructions, arrangements and devices shown and described, except only insofar as the claims may be so limited, as it will be apparent to those skilled in the art that changes may be made without departing from the principles of the invention.

What is claimed is:

1. In transmission mechanism, the combination of driving and driven shafts; ratio changing means operatively connected between said shafts and comprising a gear set including a pair of relatively rotatable elements, one of which, when held stationary, serves as a reaction element to complete a ratio drive between said shafts; means operatively connected between said shafts and including a one-way clutch engageable to establish a one-to-one drive from one of said shafts to the other of said shafts; said one-way clutch comprising a pair of concentric members and a plurality of wedging elements adapted to wedge between said concentric members; and a second one-way clutch operatively connected between said pair of relatively rotatable elements of said ratio changing means and engageable to establish a one-to-one drive from said other of said shafts to said one shaft; said second one-way clutch comprising a cylindrical surface formed on one of said rotatable elements and a helical spring having one end connected with the other of said rotatable elements; said helical spring winding against said cylindrical surface to frictionally engage the same; said second one-way clutch being disengageable by actuating the other end of said spring to wind the spring away from said cylindrical surface.

2. In transmission mechanism, the combination of driving and driven shafts; ratio changing means operatively connected between said shafts and comprising a planetary gear set including a ring gear and a sun gear, one of which gears is adapted to be held stationary for completing a ratio drive between the shafts; a one-way clutch operatively connected between the shafts for completing a one-to-one drive from said driven shaft to said drive shaft and comprising a pair of concentric members respectively connected to said shafts and a plurality of wedging elements adapted to wedge between said concentric members; a second one-way clutch operatively connected between said sun and ring gears and engageable to establish a one-to-one drive from said drive shaft to said driven shaft; said second clutch comprising a cylindrical surface on one of said gears and a helical spring having one end connected with the other of said gears and said helical spring winding against said cylindrical surface to frictionally engage the same; said second one-way clutch being disengageable by actuating the other end of said spring to wind the spring away from said cylindrical surface; a brake for the one of said gears adapted to be held stationary and engageable to complete said ratio drive; and means operable upon the engagement of said brake for actuating said other end of said spring to effect disengagement of said second one-way clutch.

3. In transmission mechanism, the combination of driving and driven shafts, a one-way clutch operatively connected between said shafts and engageable to establish a drive from said drive shaft to said driven shaft, said one-way clutch comprising a pair of concentric members respectively connected with said shafts and a plurality of wedging elements adapted to wedge between said concentric members, a planetary gear set operatively disposed between said shafts and including a sun gear and a ring gear, a brake for said sun gear for establishing a ratio drive between said shafts upon engagement of said brake, said one-way clutch overrunning when the brake is engaged, a second one-way clutch for connecting said sun gear and said ring gear and adapted to engage to lock said sun and ring gears together for causing the planetary gear set to rotate as a unit for providing a one-to-one drive from said driven shaft to said drive shaft, said second one-way clutch comprising a cylindrical surface formed on said ring gear and a helical spring having one end connected with said sun gear and said helical spring winding against said cylindrical surface to frictionally engage the same, and means actuated by said brake upon engagement thereof for automatically actuating the other end of said spring to thereby wind the spring away from said cylindrical surface to disengage said second one-way clutch.

4. In transmission mechanism, the combination of driving and driven shafts, a one-way clutch operatively connected between said shafts and engageable to establish a drive from said drive shaft to said driven shaft, said one-way clutch comprising a pair of concentric members respectively connected with said shafts and a plurality of wedging elements adapted to wedge between said concentric members, a planetary gear set operatively disposed between said shafts and including a sun gear and a planet gear carrier, a brake for said sun gear for establishing a ratio drive between said shafts upon engagement of said brake, said one-way clutch overrunning when the brake is engaged, a second one-way clutch for connecting said sun gear and said carrier and adapted to engage to lock said sun gear and carrier together for causing the planetary gear set to rotate as a unit for providing a one-to-one drive from said driven shaft to said drive shaft, said second one-way clutch comprising a cylindrical surface formed on said carrier and a helical spring having one end connected with said sun gear and said helical spring winding against said cylindrical surface to frictionally engage the same, and means actuated by said brake upon engagement thereof for automatically actuating the other end of said spring to thereby wind the spring away from said cylindrical surface to disengage said second one-way clutch.

References Cited in the file of this patent

UNITED STATES PATENTS

| | | |
|---|---|---|
| 577,961 | Lindsay | Mar. 2, 1897 |
| 1,842,798 | Raven | Jan. 26, 1932 |
| 2,064,646 | Baule | Dec. 15, 1936 |
| 2,115,963 | Osborne | May 3, 1938 |
| 2,384,448 | Banker | Sept. 11, 1945 |
| 2,577,181 | Christensen | Dec. 4, 1951 |
| 2,630,025 | Lapsley | Mar. 3, 1953 |
| 2,699,850 | Rakos | Jan. 18, 1955 |

FOREIGN PATENTS

| | | |
|---|---|---|
| 456,007 | Great Britain | Nov. 2, 1936 |